United States Patent
Leiserson et al.

(10) Patent No.: US 11,386,236 B2
(45) Date of Patent: *Jul. 12, 2022

(54) MASKED GATE LOGIC FOR RESISTANCE TO POWER ANALYSIS

(71) Applicant: Cryptography Research, Inc., San Jose, CA (US)

(72) Inventors: Andrew John Leiserson, San Francisco, CA (US); Mark Evan Marson, Carlsbad, CA (US); Megan Anneke Wachs, San Francisco, CA (US)

(73) Assignee: Cryptography Research, Inc., San Jose, CA (US)

( * ) Notice: Subject to any disclaimer, the term of this patent is extended or adjusted under 35 U.S.C. 154(b) by 401 days.

This patent is subject to a terminal disclaimer.

(21) Appl. No.: 16/427,636

(22) Filed: May 31, 2019

(65) Prior Publication Data

US 2019/0362104 A1    Nov. 28, 2019

Related U.S. Application Data

(63) Continuation of application No. 15/392,961, filed on Dec. 28, 2016, now Pat. No. 10,311,255, which is a
(Continued)

(51) Int. Cl.
*G06F 21/72* (2013.01)
*G06F 21/71* (2013.01)
(Continued)

(52) U.S. Cl.
CPC .............. *G06F 21/72* (2013.01); *G06F 21/71* (2013.01); *G06F 21/755* (2017.08); *H04L 9/003* (2013.01);
(Continued)

(58) Field of Classification Search
CPC ........ G06F 21/72; G06F 21/755; G06F 21/71; H04L 9/003
(Continued)

(56) References Cited

U.S. PATENT DOCUMENTS 6,295,606 B1    9/2001 Messerges et al.
6,330,333 B1 *  12/2001 Mizikovsky ............ H04L 9/065
                                                              380/205
(Continued)

FOREIGN PATENT DOCUMENTS

WO    WO-2008-064704 A1    6/2008
WO    WO-2013-172790 A1    11/2013

OTHER PUBLICATIONS

Maghrebi, H et al. "Evaluation of Countermeasure Implementations Based on Boolean Masking to Thwart Side-Channel Attacks." 2009 3rd International Conference on Signals, Circuits and Systems (SCS). IEEE, 2009. 1-6. Web. (Year: 2009).*

(Continued)

*Primary Examiner* — Thanhnga B Truong
*Assistant Examiner* — Angela R Holmes
(74) *Attorney, Agent, or Firm* — Lowenstein Sandler LLP

(57) ABSTRACT

A method of and system for gate-level masking of secret data during a cryptographic process is described. A mask share is determined, wherein a first portion of the mask share includes a first number of zero-values and a second number of one-values, and a second portion of the mask share includes the first number of one-values and the second number of zero-values. Masked data values and the first portion of the mask share are input into a first portion of masked gate logic, and the masked data values and the second portion of the mask share are input into a second portion of the masked gate logic. A first output from the first portion of the masked gate logic and a second output from
(Continued)

the second portion of the masked gate logic are identified, wherein either the first output or the second output is a zero-value.

19 Claims, 8 Drawing Sheets

Related U.S. Application Data continuation of application No. 14/565,821, filed on Dec. 10, 2014, now Pat. No. 9,569,616.

(60) Provisional application No. 61/915,332, filed on Dec. 12, 2013.

(51) Int. Cl.
*G06F 21/75* (2013.01)
*H04L 9/00* (2022.01)

(52) U.S. Cl.
CPC ...... *H04L 2209/04* (2013.01); *H04L 2209/12* (2013.01); *H04L 2209/16* (2013.01)

(58) Field of Classification Search
USPC ........................................ 380/252
See application file for complete search history.

(56) References Cited

U.S. PATENT DOCUMENTS

| | | | |
|---|---|---|---|
| 6,763,455 | B2 | 7/2004 | Hall |
| 7,313,677 | B2 | 12/2007 | Piry |
| 7,881,465 | B2 | 2/2011 | Degrendel et al. |
| 7,895,327 | B2 | 2/2011 | Klimov |
| 8,091,139 | B2 | 1/2012 | Klimov |
| 8,330,495 | B2 | 12/2012 | Bancel et al. |
| 9,171,182 | B2 | 10/2015 | Shukla et al. |
| 9,424,327 | B2 | 8/2016 | Ould-Ahmed-Vall et al. |
| 2009/0112896 | A1* | 4/2009 | Golic ............... H04L 9/003 |
| 2011/0255687 | A1* | 10/2011 | Farrugia ............ H04L 9/3066 380/28 |
| 2013/0054991 | A1 | 2/2013 | Kaluzhny |
| 2013/0293274 | A1 | 11/2013 | Shimizu et al. |
| 2015/0324611 | A1* | 11/2015 | Coric ............... H04L 9/003 713/189 |

OTHER PUBLICATIONS

Stott, E, P Sedcole, and P Cheung. "Fault Tolerance and Reliability in Field-Programmable Gate Arrays." IET computers & digital techniques (Print) 4.3 (2010): 196-210. (Year: 2010).*
Bhasin et al., "Combined SCA and DFA Countermeasures Integrable in a FPGA Design Flow," International Conference on Reconfigurable Computing and FPGAs, 2009, pp. 213-218, Dec. 9-11, 2009. 6 pages.
Canright et al., "A Very Compact 'Perfectly Masked' S-Box for AES (Corrected)," Applied Cryptography and Network Security, Springer Berlin Heidelberg, 2008, pp. 446-459. 16 pages.
Canright, D., "Avoid Mask Re-Use in Masked Galois Multipliers," Cryptology ePrint Archive, Report 2009/012, 2009, dated Nov. 26, 2008. 7 pages.
Danger, Jean-Luc et al., "Overview of Dual Rail With Precharge Logic Styles to Thwart Implementation-Level Attacks on Hardware Cryptoprocessors", IEEE 2009 International Conference on Signals, Circuits and Systems, IEEE, Nov. 6, 2009, pp. 1-8. 8 Pages.
EP Extended European Search Report dated Aug. 8, 2017 re: EP Appln. No. 14868741.1. 10 Pages.
EP Response Filed on Feb. 28, 2018 in Response to the Extended European Search Report dated Aug. 8, 2017 and the Communication Pursuant to Rules 70(2) and 70a(2) EPC dated Aug. 25, 2017 re: EP Appln. No. 14868741.1. 16 Pages.
Fischer et al., "Masking at Gate Level in the Presence of Glitches," Cryptographic Hardware and Embedded Systems, CHES 2005, Springer Berlin Heidelberg, 2005, pp. 187-200. 16 pages.
Kulikowski et al., "Power Attacks on Secure Hardware Based on Early Propagation of Data," On-Line Testing, 12th IEEE International Symposium, 2006. 6 pages.
Mangard et al., "Side-Channel Leakage of Masked CMOS Gates," Topics in Cryptology—CT-RSA 2005, The Cryptographers' Track at the RSA Conference 2005, San Francisco, CA, USA, Feb. 14-18, 2005, vol. 3376 of Lecture Notes in Computer Science, pp. 351-365 15 pages.
Mangard et al., "Pinpointing the Side-Channel Leakage of Masked AES Hardware Implementations," Cryptographic Hardware and Embedded Systems, CHES 2006, Springer, 2006, pp. 76-90. 15 pages.
Mangard et al., "Successfully Attacking Masked AES Hardware Implementations," Cryptographic Hardware and Embedded Systems, CHES 2005, Springer Berlin Heidelberg, pp. 157-171. 15 pages.
Moradi et al., "Glitch-Free Implementation of Masking in Modern FPGAs," 2012 IEEE International Symposium on Hardware-Oriented Security and Trust, pp. 89-95, Jun. 3-4, 2012. 7 pages.
Moradi et al., "Pushing the Limits: A Very Compact and a Threshold Implementation of AES," Advances in Cryptology, EUROCRYPT 2011, pp. 69-88. 20 pages.
Nikova et al., "Secure Hardware Implementation of Nonlinear Functions in the Presence of Glitches," Journal of Cryptology, vol. 24, No. 2, pp. 292-321, Oct. 2010. 31 pages.
Notification Concerning Transmittal of International Preliminary Report on Patentability re Int'l Appln. No. PCT/US2014/069784 dated Jun. 23, 2016. 5 Pages.
Oswald et al., "A Side-Channel Analysis Resistant Description of the AES S-Box," Fast Software Encryption, Springer Berlin Heidelberg, 2005, pp. 413-423. 11 pages.
PCT/ISR International Search Report and Written Opinion dated Mar. 6, 2015 re PCT/US14/69784. 12 pages.
Popp et al., "Evaluation of the Masked Logic Style MDPL on a Prototype Chip," Cryptographic Hardware and Embedded Systems, CHES 2007, 9th International Workshop, Vienna, Austria, Sep. 10-13, 2007. 15 pages.
Popp et al., "Evaluation of the Masked Logic Style MDPL on a Prototype Chip," Cryptographic Hardware and Embedded Systems, CHES 2007, Springer Berlin Heidelberg, pp. 81-94. 15 pages.
Popp et al., "Masked Dual-Rail Pre-Charge Logic: DPA-Resistance Without Routing Constraints," Cryptographic Hardware and Embedded Systems, CHES 2005, Springer Berlin Heidelberg, pp. 172-186. 15 pages.
Popp, Thomas et al., "Power Analysis Attacks and Countermeasures", IEEE Design & Test of Computers, IEEE, vol. 24, No. 6, Nov. 1, 2007, pp. 535-543. 9 Pages.
Trichina et al., "Small Size, Low Power, Side Channel-Immune AES Coprocessor: Design and Synthesis Results," Advanced Encryption Standard, vol. 3373, Springer Berlin Heidelberg, 2005, pp. 113-127. 15 pages.

* cited by examiner

MASKED GATE LOGIC FOR RESISTANCE TO POWER ANALYSIS

This application is a continuation application U.S. patent application Ser. No. 15/392,961, filed on Dec. 28, 2016, which is a continuation application U.S. patent application Ser. No. 14/565,821, filed on Dec. 10, 2014, now issued as U.S. Pat. No. 9,569,616, which claims the benefit of U.S. Provisional Application No. 61/915,332, filed on Dec. 12, 2013, the contents of all are hereby incorporated by reference.

TECHNICAL FIELD

Embodiments of the present disclosure relate to cryptographic systems for maintaining secrets in hostile environments.

BACKGROUND

Side channel analysis, such as simple power analysis (SPA) and differential power analysis (DPA), and their electromagnetic analogs, simple electromagnetic analysis (SEMA) and differential electromagnetic analysis (DEMA) are forms of side channel attacks in which an attacker externally observes power consumption, or EM emissions, of a cryptographic hardware device (e.g. a smart card, a set-top box, printer cartridges, etc.) to extract cryptographic keys and/or other secret information. Power consumption of microprocessors or other hardware performing cryptographic operations varies during the use of the cryptographic keys. Using SPA, the attacker can interpret power traces of electrical activity over time to determine which operations are being performed, e.g., squaring or multiplying, to compute a secret key. Using DPA, the attacker can obtain the cryptographic keys by analyzing power consumption measurements from multiple cryptographic operations performed by a vulnerable cryptographic hardware device. SPA and DPA attacks cannot generally be detected by a device, since the monitoring is normally passive, and the attack is non-invasive.

BRIEF DESCRIPTION OF THE DRAWINGS

The present embodiments are illustrated by way of example, and not of limitation, in the figures of the accompanying drawings described below.

DETAILED DESCRIPTION

Figure 1:
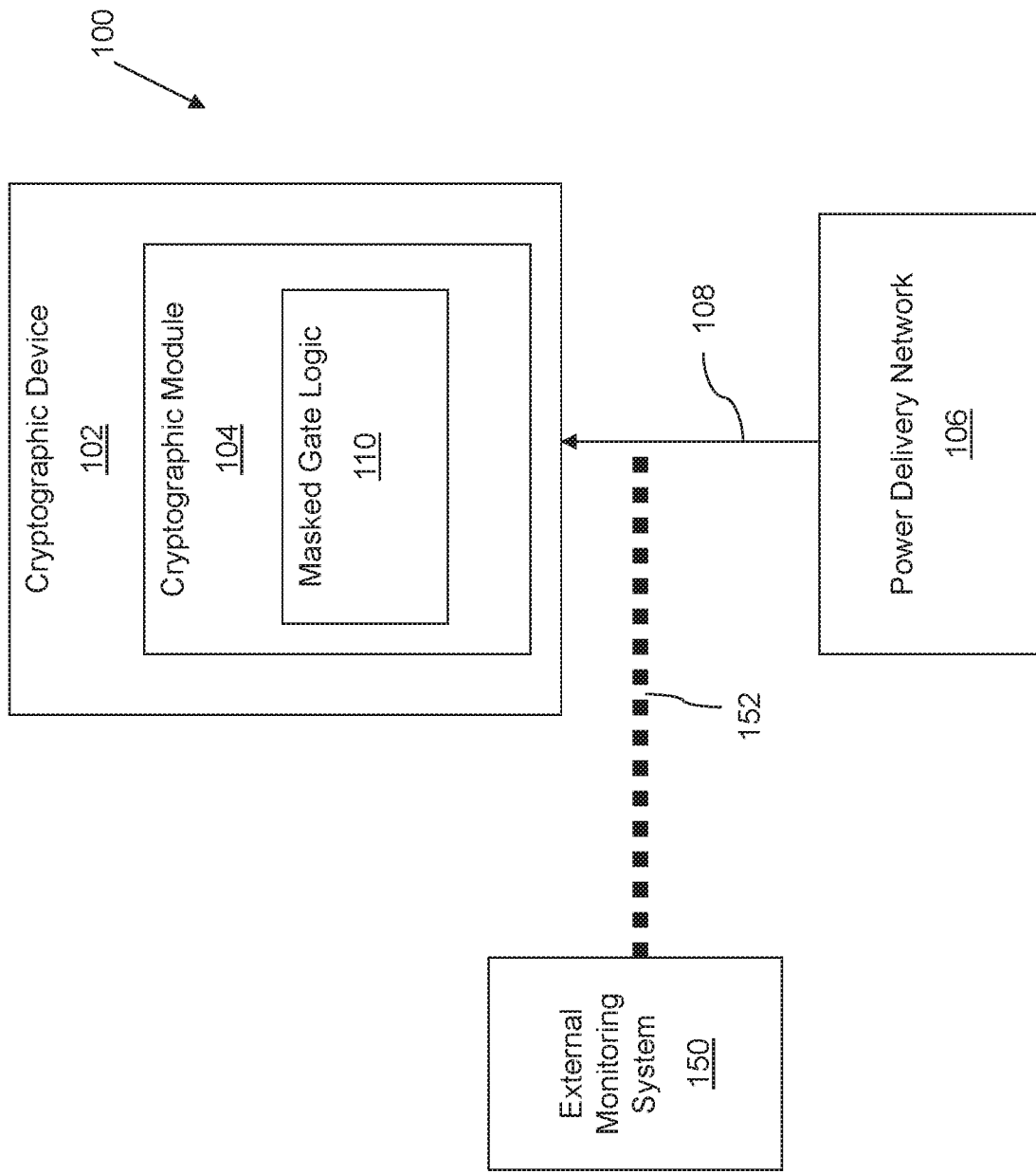
FIG. 1 is a block diagram illustrating a cryptographic device according to one embodiment.

Embodiments described herein provide a method and system for gate-level masking of secret data during a cryptographic process to prevent external power analysis from determining secret keys. In the context of power analysis countermeasures, the term "masking" can refer to strategies which divide a secret value into two or more shares, each of which can be independent of the original secret, i.e., an individual share is not indicative of the original secret. Masking can incorporate additional unpredictable (or random) data to accomplish the division into shares that are independent of the secret. According to an embodiment, a mask share and masked data values are determined, where a first portion of the mask share includes a first (e.g., "X") number of zero-values and a second (e.g., "Y") number of one-values, and a second portion of the mask share includes the first ("X") number of one-values and the second ("Y") number of zero-values. Masked data values and the first portion of the mask share are input into a first portion of masked gate logic, and the masked data values and the second portion of the mask share are input into a second portion of the masked gate logic. A first output from the first portion of the masked gate logic and a second output from the second portion of the masked gate logic are identified, wherein either the first output or the second output is a zero-value.

A final output can be based on the first output from the first portion of the masked gate logic and the second output of the second portion of the masked gate logic. The final output cannot be analyzed by an attacker to determine the original secret value based only the masked data values. In some embodiments, the operations to generate the share can be temporally separated from the operations of determining the final output using the share to further prevent an attacker from inferring the original secret value. In some embodiments, the first output and the second output of the masked gate logic can undergo additional processing by other masked gate logic.

The first portion of the masked gate logic can include a first four AND gates and a first OR gate, where the first OR gate receives outputs of the first four AND gates. The second portion of the masked gate logic can include a second four AND gates and a second OR gate, where the second OR gate receives outputs of the second four AND gates. For the AND gates, a high output results only if the inputs to the AND gate are all high. If one of the inputs to the AND gate is not high, then a low output results. In an embodiment, the output of exactly one of the eight AND gates (the eight AND gates comprising the first four AND gates and the second four AND gates) will rise (i.e., a high output on the AND gate), and the output of the OR gate receiving the output of that particular AND gate will also rise (i.e., a high output on the OR gate). In one embodiment, one or more of the AND gates and the OR gates are configured to receive a precharge signal as described herein.

Each propagation path of an integrated circuit may emit a power profile on an output that an attacker attempts to detect via power analysis. In an embodiment, the masked gate structure described herein results in signals taking each possible propagation path with equal probability, reducing the amount of information that may be obtained through power analysis. According to some embodiments, the masked gate logic structure described herein can prevent glitches and early propagation of the output so as to mask the secret values so that they are not detectable by power analysis. Additionally, precomputation of a contribution of one share (e.g., the mask share) to the masking operation can reduce the number of distinct propagation paths that may exist in the circuit. Here, the precomputed contribution can be stored in registers in one clock cycle and the masking computation can be completed in a later clock cycle to further prevent the attacker from detecting the secret values.

FIG. 1 is a block diagram of a cryptographic system 100, illustrating a cryptographic device 102 including a cryptographic module 104 with masked gate logic 110 coupled to a power delivery network 106, where power is supplied to the cryptographic device 102 from the power delivery network 106, according to one embodiment. FIG. 1 also shows an external monitoring system 150 that can monitor power supply noise via path 152.

The cryptographic device 102 can be any device that performs operations on secret data during the use of the cryptographic device 102. Examples of a cryptographic device can include, but are not limited to, a television set top box, a smart card, a network firewall, a mobile phone, a tablet computer, a laptop computer, a desktop computer, an embedded system, a server computer, an authentication device (e.g., a token), a telecommunications device, a component in public infrastructure (e.g., smart meters), an automotive system, a defense system, a printer cartridge, or the like. The cryptographic module 104 of the cryptographic device 102 can perform cryptographic algorithms for key generation, digital signatures, and message authentication codes (MACs), encryption, and decryption algorithms, such as Data Encryption Standard (DES), Advanced Encryption Standard (AES), Elliptic Curve Cryptography, Rivest-Shamir-Adleman (RSA), etc. A secret key can be generated for use in encrypting and decrypting a message according to a particular algorithm to attempt to prevent others from determining the contents of the message, and hashing and/or signing a message to prevent others from duplicating, modifying, or counterfeiting a message.

However, execution of the algorithm requires the cryptographic module 104 to perform certain mathematical operations, and the performance of each mathematical operation consumes a certain amount of power. In other words, a measurement of electrical current or other phenomena in the power delivery network 106 along path 108 may vary according to the mathematical operation being performed. For example, the shape of a waveform corresponding to a multiplying operation can be different from the shape of a waveform corresponding to a squaring operation.

The external monitoring system 150, e.g., operated by an attacker, can attempt to monitor electrical activity variations via path 152, and gather information about electrical activity variations. Such variations can be detected by the external monitoring system 150 by, for example, using an antenna to monitor changes in the electromagnetic field near the cryptographic device 102, or by attaching probes (e.g., oscilloscope probes) to the cryptographic device. The attacker could attempt to use information gathered by the external monitoring system 150 for analysis, e.g., by SPA or DPA, to determine the cryptographic keys used by the cryptographic device 102. For example, the attacker could attempt to use recorded power supply variations over time to determine the mathematical operations being performed and to compute the secret key being used by the cryptographic device 102. If the attacker determines the secret key, the attacker can intercept and decrypt messages (e.g., secret messages) being sent by the cryptographic module 104 that the user or manufacturer of the cryptographic device 102 does not want others to know.

However, as described in various embodiments of the masked gate logic 110, the masked gate logic 110 conceals the secret key such that it is more difficult for an attacker to determine the secret key through analysis of the electrical activity variations from the power delivery network 106 along path 108, or through other techniques that measure small variations in electrical activity inside cryptographic device 102.

Masking can be applied at different levels of abstraction. For example, masking can be performed at a gate level. Applying masking at the gate level can be beneficial because existing designs can be modified by applying a relatively simple transformation. However, circuits can exhibit glitches and early propagation, which can interfere with the effectiveness of gate-level masking, even when the masking technique is mathematically correct. Two common masking strategies are additive and multiplicative. Additive represents the original data as the sum of two shares, each of which is unpredictable. Multiplicative represents the original data as the product of two shares.

To illustrate masking techniques, the following description refers to Advanced Encryption Standard (AES). It should be noted that masking may be employed by embodiments of other cryptographic standards, as well.

In AES, the non-linear operation required to compute an AES S-box transformation is inversion in $GF(2^8)$. The S-box (substitution box) effects a permutation of a set of 8-bit values (i.e., of [0, 255]). Inversion in $GF(2^8)$ can be computed by independent operations on two multiplicative shares. However, multiplicative masking may require treating a value of zero as a special case.

An additive masking of secret data A can use two shares M (i.e., a mask share) and $A \oplus M$ (i.e., a masked data share). When the input to the AES S-box is represented in this manner, there likely is no simple mathematical way to perform the S-box transformation by operating on these shares independently. In other words, other than possibilities which require a lookup in a 256×8 table of masked values, it is not known what functions $f$ and g would satisfy the criteria $f(M) \oplus (A \oplus M) = A^{-1}$.

For reasons of brevity and clarity, the discussion that follows refers to two-input functions operating on secret data a and b and producing an output q. The techniques presented can be readily extended to functions of more than two inputs.

Gate-level masking strategies can be used to mask data using standard Boolean logic gates (e.g., AND, OR, or the like). For example, given a two-input Boolean function $f$: a, b→q, two common masked versions off are:

$$g(a \oplus m_a, b \oplus m_b, m_a, m_b, m_q) = f(a,b) \oplus m_q$$

$$h(a \oplus m, b \oplus m, m) = f(a,b) \oplus m$$

The former is appropriate for "re-masking" the data with a fresh mask after each Boolean function, while the latter is appropriate for using a single mask throughout.

The masked gates, as described herein, can be used for computing Boolean functions without leaking the original values of the secret data a, b, and q. The masked gates can be used as building blocks to logic that performs more complex functions. Alternatively, given a cryptographic circuit that uses standard Boolean gates already, the existing gates in that circuit can be swapped for equivalent masked gates to yield a masked implementation of the existing circuit.

In order to illustrate the advantages of the present disclosure, deficiencies of other masking techniques will now be discussed in more detail. For a masking technique to be effective, the masked implementation (for example, logic implementing masked functions g or h above) must not leak information about the secret data a, b, and q. As an example, an implementation which removes masking from the inputs, applies ƒ, and then reapplies masking to the output, would leak information about the secret data.

One example of a masked gate that may leak information includes four AND gates and four XOR gates. This masked gate implements the masked function g for ƒ(a, b)=a & b. The gate computes $m_a$ & $m_b$, (a⊕$m_a$) & $m_b$, $m_a$ & (b⊕$m_b$), and (a⊕$m_a$) & (b⊕$m_b$), then XORs all of these values along with $m_q$ in a specific order. When viewed as a sequence of mathematical operations, none of the intermediate values in this circuit are correlated with (i.e., leak information about) the secret data. However, when implemented in hardware, the inputs to the gate will arrive at different times. This will expose other intermediate values that do not appear in the mathematical model of the gate. Here, the leakage may be due to glitches.

In another example of a conventional masking technique, the masked gate structure, which also leaks information, implements the masked function h using a pair of Majority gates, again for ƒ(a, b)=a & b. This gate can have significant leakage due to early propagation, which refers to the possibility that the value of the gate's output may be fully determined by a subset of the inputs. In the case of a masked AND gate using this technique, a masking value m and unmasked values $a_m$ and $b_m$ are input to a Majority gate. If a masking value, m, and either of the unmasked data values, $a_m$ or $b_m$, are both zero or both one, then the value of the third input does not matter. This condition occurs if the unmasked value of the corresponding input is zero. The masked gate of this example also uses a single mask bit for the entire circuit. The single mask bit does not provide sufficient randomness to effectively conceal the secret data being operated upon.

As described herein, an attacker can analyze the electrical behavior of logic gates in silicon. The electrical behavior of logic gates in silicon can depend on numerous factors, some of which can be readily predicted and modeled in simulation. For example, one modeling strategy can describe the behavior of a gate in terms of two measurements. The first, propagation delay through the gate, may be measured as the time from when the input crosses the voltage level that is 50% of the operating voltage to the time when the output does so. The second, transition time, may be measured as the interval from when the output of the gate reaches 10% of the operating voltage to the time when it reaches 90% in the case of a rising transition, and may be the opposite in the case of a falling transition. The value of these measurements for a switching event can depend on many factors, for example, the transition time at the input of a gate, output load (e.g., wire capacitance) of the gate, and the state of other inputs (including non-switching inputs) of the gate. Any variation in these factors (e.g. a difference in the transition time at the output of a gate) that does not occur with equal probability regardless of the value taken by a secret, may allow an external monitoring system such as external monitoring system 150 to obtain information about the secret.

A conventional masking strategy might seek to ensure that the probability of a masked gate output having a value of one (vs. zero) at the end of a clock cycle is the same regardless of the value of a secret. However, if there are multiple electrical signal paths associated with the masked gate output having a final value of one, an external monitoring system may be able to obtain information about a secret by exploiting differences among the signal paths. A masking strategy employing an activity image metric might seek to ensure that each electrical signal path in the masked gate is excited with the same probability regardless of the value of a secret. Here, "activity image" refers to some or all of the states and transitions in the masked gate and connected logic that may influence the electrical behavior of the masked gate output.

Some embodiments of gate-level masking may "precharge" circuit nodes. During a precharge event, the circuit nodes are driven to an electrical potential (voltage) that is independent of data values operated upon by the gate. For example, the circuit nodes may be precharged to the ground potential. Precharge events may occur between each useful operation (or "evaluation") performed by the masked gate. The precharge step serves to reduce interaction between successive evaluations, and to even out the power consumed upon each evaluation. Precharge may be accomplished, for example, by activating transistors dedicated to such purpose, or by applying a special input vector which is known to cause the circuit to settle at the desired precharge voltage(s).

The previously mentioned masked gate using Majority primitives typically incorporates a precharge step. For a three-input majority gate, there are eight possible input vectors. At the transition from precharge phase to evaluate phase, each of the three inputs may either be low and stable, or may rise. The analysis for the transition from the evaluate phase to the precharge phase can be the same, other than the substitution of falling edges for rising edges. The output of the majority gate computes the function (A & B) (A & C) (B & C). Here, "&" represents the Boolean operation AND, and "|" represents the Boolean operation OR. An analysis of activity images for this gate might consist, in part, of the following table.

| A & B | A & C | B & C | Output | Likelihood when A^C = 0 | Likelihood when A^C = 1 |
|---|---|---|---|---|---|
| 0 | 0 | 0 | 0 | 0.5 | 0.5 |
| 0 | 0 | Rise | Rise | 0 | 1 |
| 0 | Rise | 0 | Rise | 1 | 0 |
| Rise | 0 | 0 | Rise | 0 | 1 |
| Rise | Rise | Rise | Rise | 1 | 0 |

In this analysis, A and B are the masked inputs, and C is the mask. A XOR C, also referred to herein as A^C, where "^" can be defined as "exclusive or" (XOR), is the unmasked value of one of the secret inputs. To avoid leakage, the activity in the circuit should be independent of this unmasked value. As seen in the table, the likelihood of observing a rising transition at the output of each of the AND gates is not independent of the secret value A^C, even though the likelihood of observing a rising transition at the final output is independent of A^C.

Aspects of the present invention address deficiencies of conventional masking techniques discussed above by avoiding glitches and early propagation and by substantially balancing an activity image leakage metric. Further, aspects of the present disclosure can precompute a contribution of a mask share to the output to reduce the number of distinct propagation paths that may exist in the circuit. As described herein, the precomputed contribution can be stored in registers in one clock cycle and the masking computation can be completed in a later clock cycle. In one embodiment, a mask share is determined, where a first portion of the mask share includes a first (e.g., X) number of zero-values and a second (e.g., Y) number of one-values, and a second portion of the mask share includes the first (e.g., X) number of one-values and the second (e.g., Y) number of zero-values. Masked data values and the first portion of the mask share are input into a first portion of masked gate logic, and the masked data values and the second portion of the mask share are input into a second portion of the masked gate logic. A first output from the first portion of the masked gate logic and a second output from the second portion of the masked gate logic are identified, where either the first output or the second output is a zero-value. A final output can be based on the first output and the second output. The final output cannot be analyzed by an attacker to identify the original secret value based only on the masked data values. In some embodiments, the operations to generate a mask share can be temporally separated from the operations of determining the final output using the mask share to further prevent an attacker from inferring the original secret value. In some embodiments, the first output and the second output of the masked gate logic can undergo additional processing by other masked gate logic.

Figure 2A:
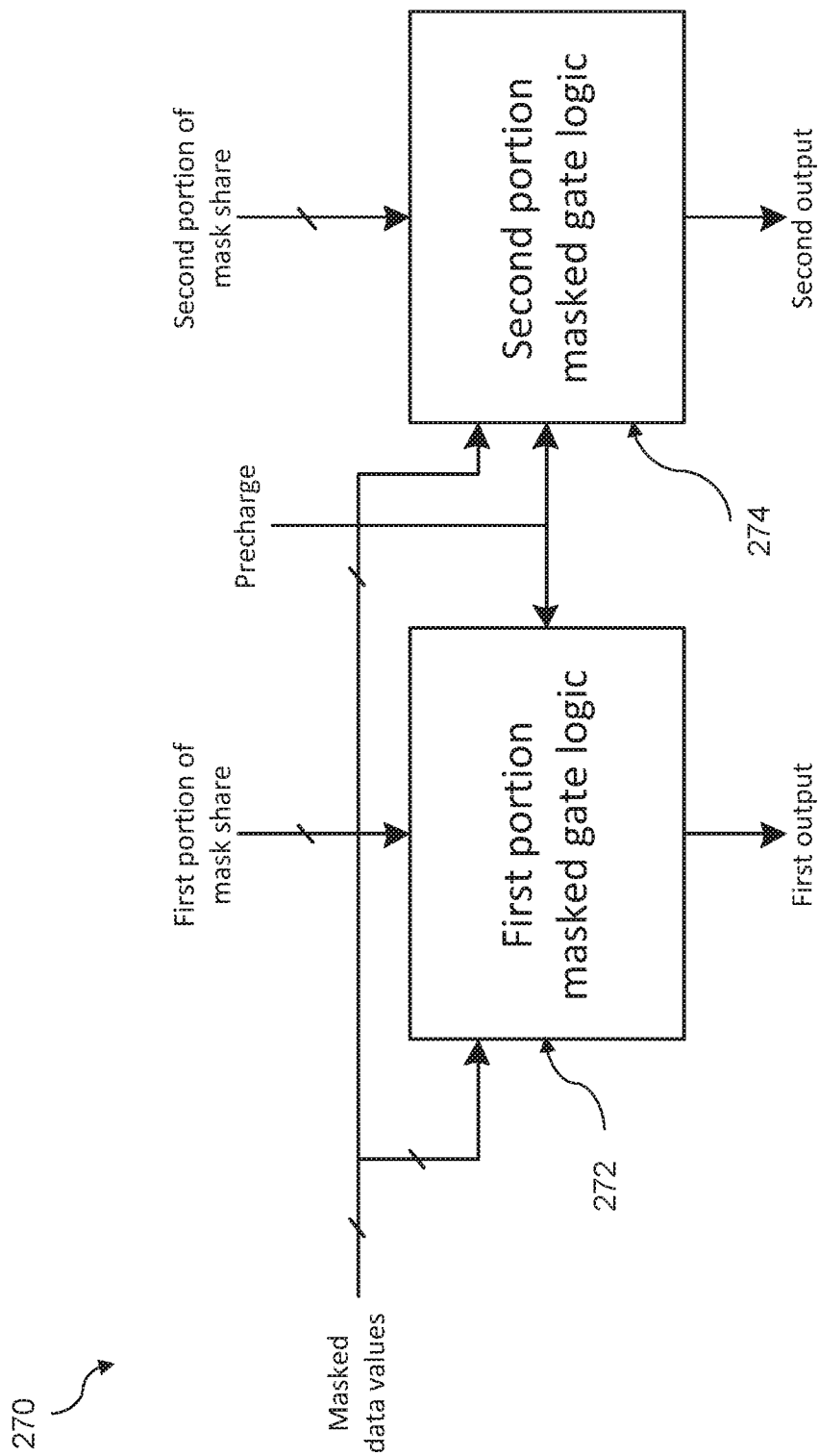
FIG. 2A is a block diagram illustrating masked gate logic according to one embodiment.

FIG. 2A is a block diagram illustrating a general structure of an embodiment of masked gate logic 270 (e.g., masked gate logic 110 of FIG. 1), wherein a first portion 272 and a second portion 274 can receive a precharge signal. The first portion 272 can also receive a first portion of a mask share and masked data values, and the second portion 274 can also receive a second portion of a mask share and masked data values. The first portion 272 can output a first output, and the second portion 274 can output a second output. In some embodiments, the precharge signal may be omitted. The precharge signal may be omitted, for example, because the precharge signal is effected by the presence of a certain state on the masked data values or the mask share inputs, or because no precharge signal is used.

Figure 2B:
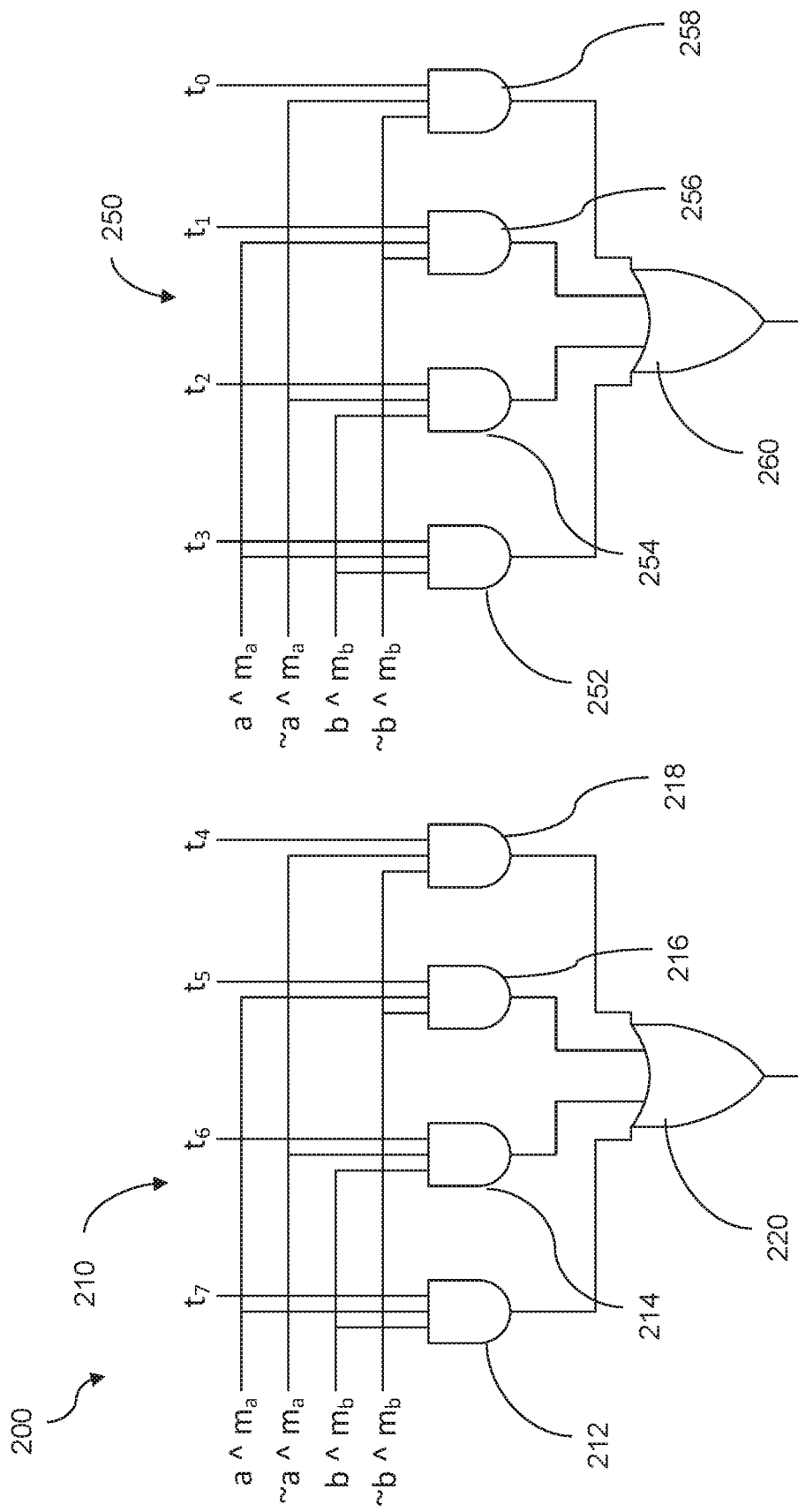
FIG. 2B is a block diagram illustrating masked gate logic according to one embodiment.

FIG. 2B is a block diagram illustrating masked gate logic 200 (e.g., masked gate logic 270 of FIG. 2A) using AND and OR gates according to one embodiment. In this example, masked gate logic 200 includes a first portion 210 (e.g., first portion 272 of FIG. 2A) including AND gates 212, 214, 216, and 218, and OR gate 220, and a second portion 250 (e.g., second portion 274 of FIG. 2A) including AND gates 252, 254, 256, and 258, and OR gate 260.

Masked data values represent a portion, or all, of secret data along with additional data, referred to herein as masking values (e.g., m, $m_a$, $m_b$, and $m_q$). In one embodiment, the masked data values can be derived by performing a Boolean operation between the cipher input and the masking value. As illustrated in FIG. 2B, the masked data values of the logic gate 200 are represented in a one-hot encoding, with a pair of complementary wires for each bit of data. A one-hot encoding may, for example, represent a logical value of zero by driving a first wire to a zero state and a second wire to a one state, and represent a logical value of one by driving the first wire to a one state and the second wire to a zero state. As will be discussed later, the one-hot encoding allows for a precharge mechanism. As illustrated in FIG. 2B, the wires representing the masked data can have the values a^$m_a$, ~a^$m_a$, b^$m_b$, and ~b^$m_b$, where "^" can be defined as "exclusive or" (XOR), and "~" can be defined as the complement (or inverted signal). The complement of a signal in dual rail logic can also be indicated with "'".

A mask share can include multiple portions. For an n-input masked gate, the number of bits in each portion of the mask share is $2^n$. As illustrated in FIG. 2B, a first portion of a mask share includes mask share values $t_7$, $t_6$, $t_5$, and $t_4$, and a second portion of the mask share includes mask share values $t_3$, $t_2$, $t_1$, and $t_0$. Here, the first portion of the mask share corresponds to the first portion 210 of the masked data logic 200, and the second portion of the mask share corresponds to the second portion 250 of the masked data logic 200. These mask share values may be stored in a storage element, such as a look up table (LUT), registers, random access memory (RAM), first-in-first-out (FIFO) buffer (which can be implemented in memory, registers, or other storage mechanisms), or may be immediately presented to the masked gate logic. As illustrated in FIG. 2B, the AND gates each receive one of the mask share values. These mask share values can be computed using various Boolean operations upon multiple masking values, $m_a$, $m_b$, $m_q$. In one embodiment, the mask share values $t_n$ for a masked gate computing $f(a, b) = a$ AND $b$ can be computed as follows:

$$t_0 = m_b \& m_a \& m_q | (\sim m_b | \sim m_a) \& \sim m_q$$

$$t_1 = m_b \& \sim m_a \& m_q | (\sim m_b | m_a) \& \sim m_q$$

$$t_2 = \sim' m_b \& m_a \& m_q | (m_b | \sim m_a) \& \sim m_q$$

$$t_3 = \sim m_b \& \sim m_a \& m_q | (m_b | m_a) \& \sim m_q$$

$$t_4 = \sim t_0$$

$$t_5 = \sim t_1$$

$$t_6 = \sim t_2$$

$$t_7 = \sim t_3$$

Here, $m_a$ and $m_b$ are input masking values and $m_q$ is the output masking value. In one embodiment, the first portion (e.g., $t_0$-$t_3$ above) of the mask share contains three zeros and a one, and the second portion (e.g., $t_7$-$t_4$ above) of the mask shares is its complement. The current values of the masked data shares (a^$m_a$, b^$m_b$ and their complements) are combined with the mask share values as input into the AND gates.

In one embodiment, a single random bit can be used for generation of each set of mask share values $t_i$. Here, the input masks (e.g. $m_a$ and $m_b$) can be either all-zero or all-one, and $m_q$ can have the same values as the input masks, which could be useful when only a limited amount of unpredictable data can be obtained for masking.

Other masked gate logic, including masked gate logic having n>2 inputs, can be implemented by changing the mask share values $t_i$ appropriately. In general, mask share values $t_{2^n}$ to $t_{2^{n+1}-1}$ for performing a masked computation of an n-input function $f(x)$ given an n-bit input mask m and a 1-bit output mask $m_q$ can be computed as:

$$t_{i+2^n} = f(i \oplus m) \oplus m_q$$

Mask share values $t_0$ to $t_{2^n-1}$ are the complements of entries $t_{2^n}$ to $t_{2^{n+1}-1}$. When implementing a masked gate with more than two inputs, an embodiment might have $2^n$ AND gates in each of the first portion and the second portion of the masked gate logic.

In one example, $\oplus$ is the Boolean operation "exclusive or" or "XOR".

In one embodiment, mask shares can also be generated for other types of masking (e.g., using one of the input masks as the output mask, or restricting all the input masks to have the same Boolean value). In one embodiment, switching is possible between different types of masking during the operation of the masked gate logic, depending on the degree of side-channel attack resistance needed for each cryptographic operation. The variable masking strategy can trade off the cost of random bits for masking against the amount of DPA resistance obtained. When more DPA resistance is desired despite greater cost, the mask share may be generated with n+1 random bits, and when less DPA resistance is needed and it is desirable to reduce the number of random bits used, a single random bit may be replicated to create the n-bit input mask m, and that random bit may also be used for the output mask $m_q$.

In an embodiment, a circuit implementation of the masked gate logic can be driven to a precharge state between each evaluation, for example, by applying an all-zero input vector. Assuming this is done, then in each evaluation, the output of exactly one of the eight AND gates rises, and the output of the OR gate driven by that AND gate also rises. The precharging can occur prior to inputting the masked data values, the first portion of the mask share, and the second portion of the mask share. Alternatively, precharging can occur subsequent to inputting the masked data values, or precharging may not occur at all.

Returning to FIG. 2B, inputs to AND gate 212 include masked data share $a\hat{\ }m_a$, masked data share $b\hat{\ }m_b$, and mask share $t_7$. Inputs to AND gate 214 include masked data share $\sim a\hat{\ }m_a$, masked data share $b\hat{\ }m_b$, and mask share $t_6$. Inputs to AND gate 216 include masked data share $a\hat{\ }m_a$, masked data share $\sim b\hat{\ }m_b$, and mask share $t_5$. Inputs to AND gate 218 include masked data share $\sim a\hat{\ }m_a$, masked data share $\sim b\hat{\ }m_b$, and mask share L. Inputs to AND gate 252 include masked data share $a\hat{\ }m_a$, masked data share $b\hat{\ }m_b$, and mask share $t_3$. Inputs to AND gate 254 include masked data share $\sim a\hat{\ }m_a$, masked data share $b\hat{\ }m_b$, and mask share $t_2$. Inputs to AND gate 256 include masked data share $a\hat{\ }m_a$, masked data share $\sim b\hat{\ }m_b$, and mask share $t_1$. Inputs to AND gate 258 include masked data share $\sim a\hat{\ }m_a$, masked data share $\sim b\hat{\ }m_b$, and mask share $t_0$. Inputs to OR gate 220 include outputs from AND gates 212, 214, 216, and 218. Inputs to OR gate 260 include outputs from AND gates 252, 254, 256, and 258.

The output of OR gate 220 can undergo further operations. In an embodiment, the output of OR gate 220 during the evaluation phase can have the value $(a\&b)\hat{\ }m_q$, where $\hat{\ }$ represents the XOR operation. Similarly, the output of OR gate 260 during the evaluation phase can have the value $\sim(a\&b)\hat{\ }m_q$.

A final output can be based on the output from the first portion 210 and the output from the second portion 250. The final output may not be determinable based only on the masked data values.

In one embodiment, the mask share can be determined in a clock cycle that is temporally separated from the clock cycle where the final output is determined, which will be discussed below in greater detail.

According to one embodiment, the output from the first portion 210 and the output from the second portion 250 can undergo additional processing by other masked gate logic.

FIG. 2B shows one possible embodiment of the masked gate logic. Other combinations of gates may be used to implement the masked gate while still minimizing or eliminating glitches and early propagation, and substantially balancing an activity image metric. In another possible embodiment, each of gates 212, 214, 216, 218, 252, 254, 256, 258, 220, and 260 may instead be NAND gates. When implementing the masked gate, the circuit should be verified to be free of logic hazards, for example, by constructing a Karnaugh Map. Logic hazards may manifest as glitches on the output of the masked gate. Early propagation may be avoided by ensuring that an invalid state on an input propagates to an invalid state on an output. In the embodiment shown in FIG. 2B, the AND/OR structure ensures that when either masked data input pair has two zero values, those values will propagate to cause the outputs to both be zero. Other embodiments may use an OR/AND structure in which an all-ones input propagates to an all-ones output. The AND/OR and OR/AND structure are offered here as illustrations, however the purpose of selecting among the mask share values according to a masked data value can be accomplished using other structures.

In other possible embodiments, each portion of the masked gate may be mapped to one or more LUT primitives in an FPGA. For example, each of gates 212, 214, 216, 218, 220, 252, 254, 256, 258, and 260 may be implemented in a separate LUT. Other embodiments may implement the function of gates 212 and 214 in a first LUT, the function of gates 216 and 218 in a second LUT, and combine the output of the first LUT and the second LUT in a third LUT, thus computing the same value that would be computed by OR gate 220.

In an embodiment, the masked gate may be implemented in semi-custom logic or fully-custom logic. Devices using semi-custom logic and fully-custom logic can be more expensive to develop (e.g. due to the extra care needed when working at the transistor level), but can also use less silicon area, thus reducing manufacturing costs, or can consume less power. An example embodiment using custom logic using pass transistors is described below with respect to FIG. 6.

Embodiments of the masked gate described herein need not utilize complementary metal-oxide-semiconductor (CMOS) logic. The masked gate may be implemented using, for example, transistor-transistor logic (TTL) or emitter-coupled logic (ECL). The masked gate may also utilize multiple-gate field-effect transistors.

Figure 3:
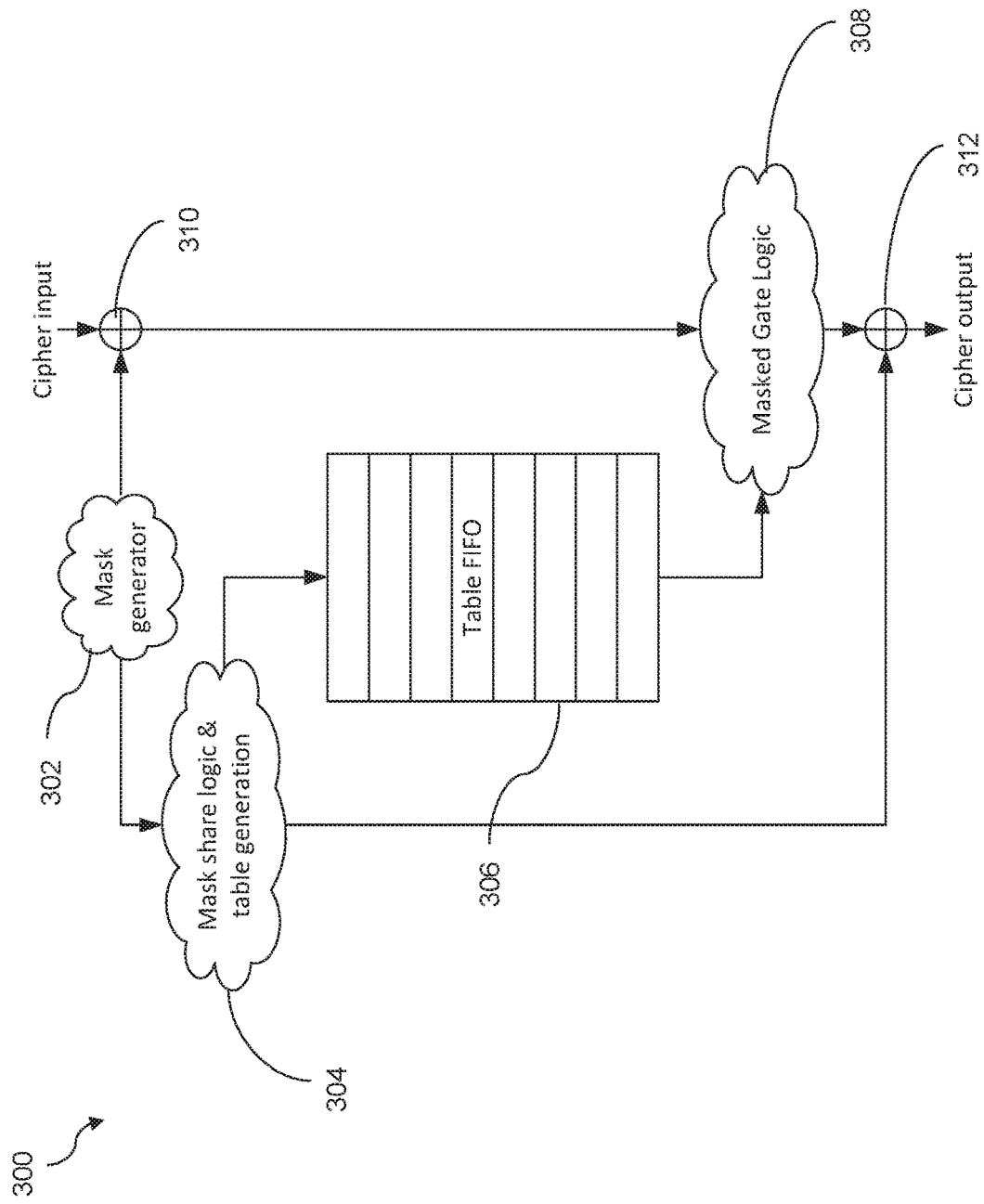
FIG. 3 is a block diagram illustrating a cipher implementation incorporating masked gate logic according to one embodiment.

FIG. 3 is a block diagram illustrating a cipher implementation 300 incorporating masked gate logic according to one embodiment. The cipher implementation 300 can be included in cryptographic module 104 of FIG. 1. Cipher implementation 300 includes mask generator 302, table generator 304, mask share FIFO buffer 306, and masked gate logic 308. Masked gate logic 308 can be masked gate logic 200 of FIG. 2B.

Here, mask generator 302 generates a masking value (e.g., $m_a$, $m_b$, and $m_q$) to be used by mask share logic and table generation 304 to generate a mask share t, including a first portion and a second portion. Mask generator 302 may generate masking values, for example, by using a pseudo-random number generator or by using a true-random number generator. Mask generator 302 may also receive masking values as input, for example, from a different component of cryptographic module 104 or cryptographic device 102. Mask generator may also generate masking values using logic functions. In embodiments where the output of a first masked gate is connected to the input of a second masked gate, mask generator 302 may set the input mask for the second masked gate (e.g. $m_{a2}$) to equal the output mask for the first gate (e.g. $m_{q1}$). In embodiments where the outputs of multiple masked gates are processed by other logic (e.g. the masked XOR described below), mask generator 302 may set the input mask for a third masked gate to a function of the outputs of a first and a second masked gate (e.g. $m_{a3}=m_{q1}\hat{\ }m_{q2}$).

In one embodiment, the mask share t is stored in a first-in-first-out (FIFO) buffer (mask share FIFO buffer 306) until a later time when the masked gate logic operates on the mask share and masked data values. The masking value can also be used to mask a cipher input to determine masked data values, e.g., via a Boolean operation 310 such as XOR. The masked gate logic 308 can receive the masked data values, along with the mask share from the mask share FIFO buffer 306. The masked gate logic 308 then determines a first output, based on a first portion of the mask share and the masked data values, and a second output, based on a second portion of the mask share and the masked data values. The first output and the second output can be used to determine a final output, or the first output and the second output can be separately received by one or more other gates or devices. In FIG. 3, a Boolean operation 312, e.g., XOR, can be performed on the output of the data share logic 308 and a masking value generated by mask generator 302.

For purposes of resistance to higher order DPA, the operations on the mask share can be temporally separated from the operations on the associated masked data values. In one possible embodiment, the mask share operations and table generation are performed first, and the generated tables are buffered in a FIFO buffer until needed for use in the masked gate logic 308. In one embodiment, a FIFO buffer can also be present between the cipher input and the masked gate logic 308.

Figure 4:
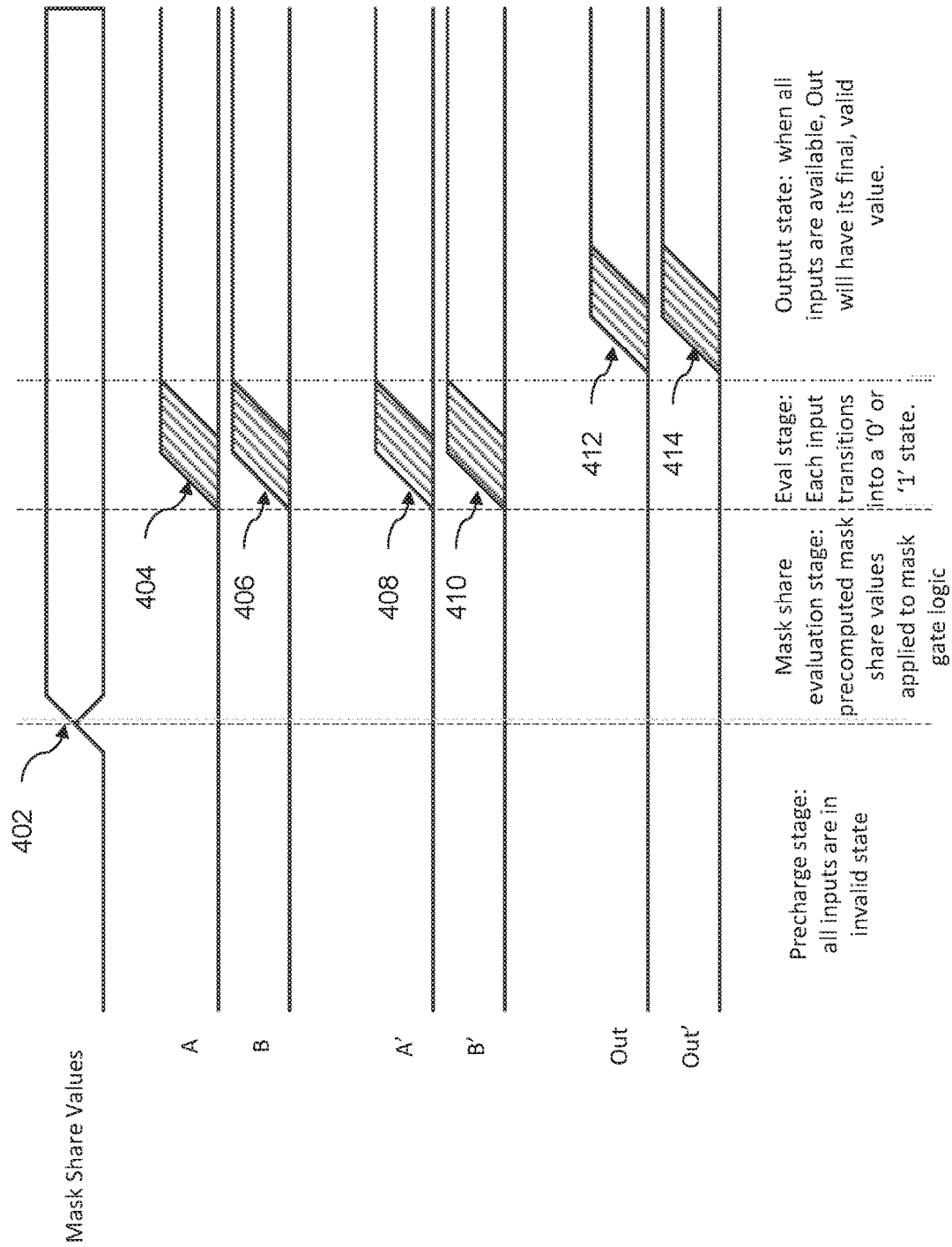
FIG. 4 is a diagram illustrating a precharge-evaluate sequence according to one embodiment.

FIG. 4 is a diagram illustrating a precharge-evaluate sequence over time according to one embodiment. For example, the charging sequence can be a charging sequence applied in cipher implementation 300.

In the precharge state, inputs may, for example, all be set to zero. For an embodiment using one-hot masked data value input pairs, the zero/zero state is an invalid state, meaning it does not correspond to a masked data value of either zero or one. Placing the input pairs in an invalid state during the precharge state helps to avoid early propagation. The mask share is loaded in a mask share evaluation stage, which occurs after the precharge state and prior to applying the other inputs, according to one embodiment. In the mask share evaluation stage, precomputed values are applied to the masked gate logic at time 402. In other embodiments, the mask share is not loaded prior to applying other inputs.

In the evaluation stage, each input, masked data values A, B, A', and B', transitions at times 404, 406, 408, and 410, respectively, into a "0" or "1" state in the masked gate logic. However, these transitions can occur at varied times, as shown. In one example, each input is precharged to a "0" value. In the evaluation stage, each input can either stay at a "0" value or transition to a "1" value.

In the output state, when all inputs are available, outputs, Out and Out', are determined and output at time 412 and 414, respectively. For example, a valid final output can be determined. In another embodiment, Out and Out' can be separately input to one or more other gates or devices. Here, loading of the mask share, evaluation of the masked data values, and determination of the output are temporally separated as a countermeasure to power analysis attack.

Figure 5:
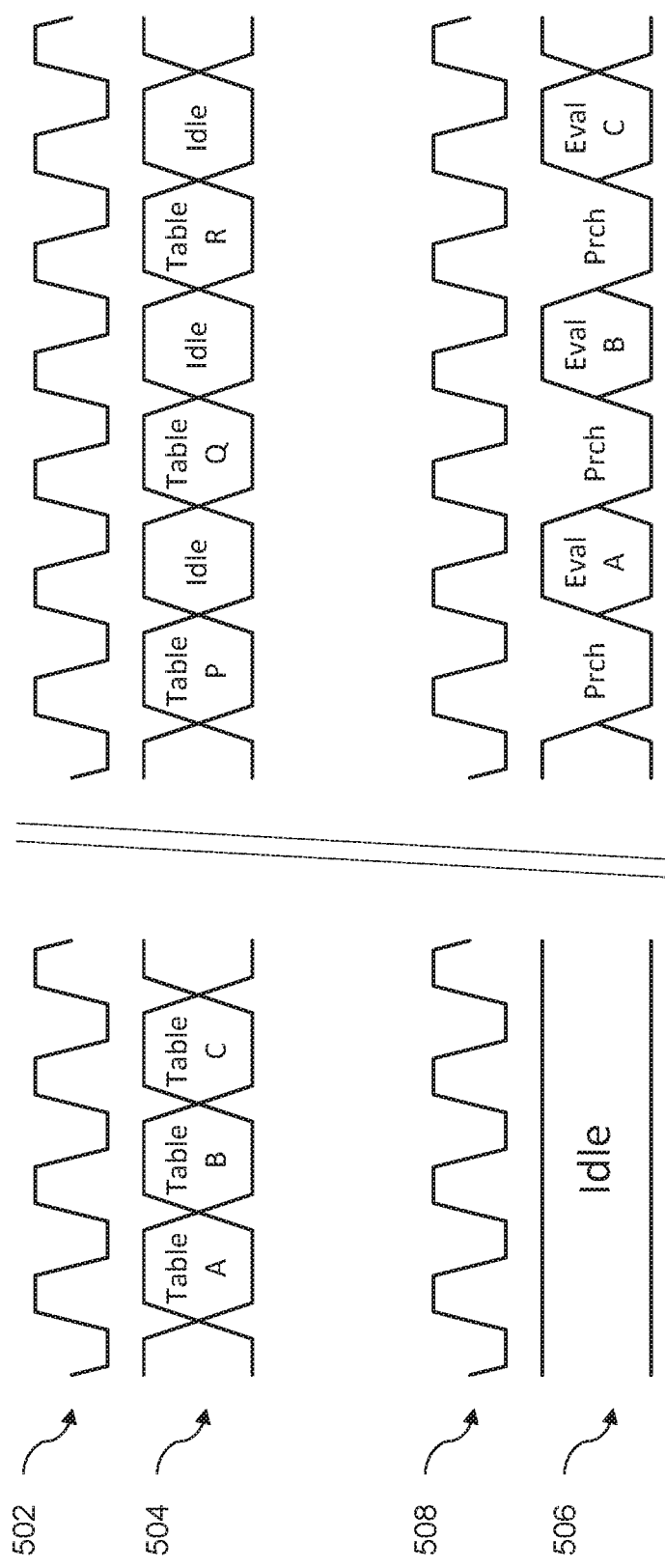
FIG. 5 is a diagram illustrating timing of operations according to one embodiment.

FIG. 5 is a diagram illustrating timing of operations according to one embodiment. In other words, operations are shown along a timeline. For example, the operations can be performed by cipher implementation 300 of FIG. 3. Clock 502 is a signal that oscillates between a high and a low state and is utilized to coordinate actions of circuits. For example, clock 502 can be produced by a clock generator. In one embodiment, clock 502 approximates a square wave with a 50% duty cycle with a regular frequency. Circuits using the clock 502 for synchronization may become active at either the rising edge or falling edge.

Table generation 504 (e.g., mask share generation) runs in advance of table use 506 (e.g., masked gate evaluation). For example, one table (e.g., Table A, Table B, Table C, etc.) can be generated in each clock cycle of clock 502, as shown, or multiple tables can be produced in each clock cycle. Also, tables can be generated every certain number of clock cycles (e.g., every other clock cycle). An arbitrary amount of time may pass between table generation and table use. Table generation may be performed immediately prior to table use. However, table generation performed immediately prior to table use may be less resistant to higher order DPA.

Table use 506 shows that no table use may be performed for a certain period (i.e., Idle state). Each masked gate can be precharged to a certain value (e.g., "0") between evaluations. Here, the precharge occurs in alternating clock cycles. If a circuit instantiates a single masked gate, then each evaluation cycle can consume one table. If the circuit instantiates multiple masked gates (not shown), then multiple tables may be consumed in each evaluation. In one example, after a precharge is performed in clock cycle Prch, Table A (which was generated a certain number of clock cycles previously) can be evaluated in clock cycle Eval A.

In one embodiment, the table generation logic does not need to be precharged. In the implementation shown, where table generation and table consumption each have a rate of one table per clock, the table generation logic can have idle cycles in the steady state. The idle cycles are shown concurrent with the masked gate evaluation cycles, however, this is not essential. The table generation idle cycles could also be concurrent with the precharge cycles, or not synchronized with the evaluation sequence at all. The table generation may also be performed on a different clock 508 from the masked gate evaluation.

In one embodiment, a logic function does not require any circuit modification to accommodate masked data generated by the masked gate logic. For example, in the case of Boolean masking, the exclusive or (XOR) operation is linear with respect to the masking, so does not require modification. However, when incorporating such operations among the masked gates, care must be taken to maintain the glitch- and early-propagation-free characteristics of the signals in the circuit.

One possible glitch- and early-propagation-free implementation of an XOR operation is as follows:

$i0 = \text{AND}(a'_m, b'_m)$ $i1 = \text{AND}(a_m, b_m)$ $i2 = \text{AND}(a_m, b'_m)$ $i3 = \text{AND}(a'_m, b_m)$ $o_m = \text{OR}(i2, i3)$ $o'_m = \text{OR}(i0, i1)$ Another operation that does not require modification to work on masked data is logical inversion (NOT). A NOT operation among the masked gates, can be accomplished by swapping the wires of a complementary pair, rather than by using inverters.

Figure 6:
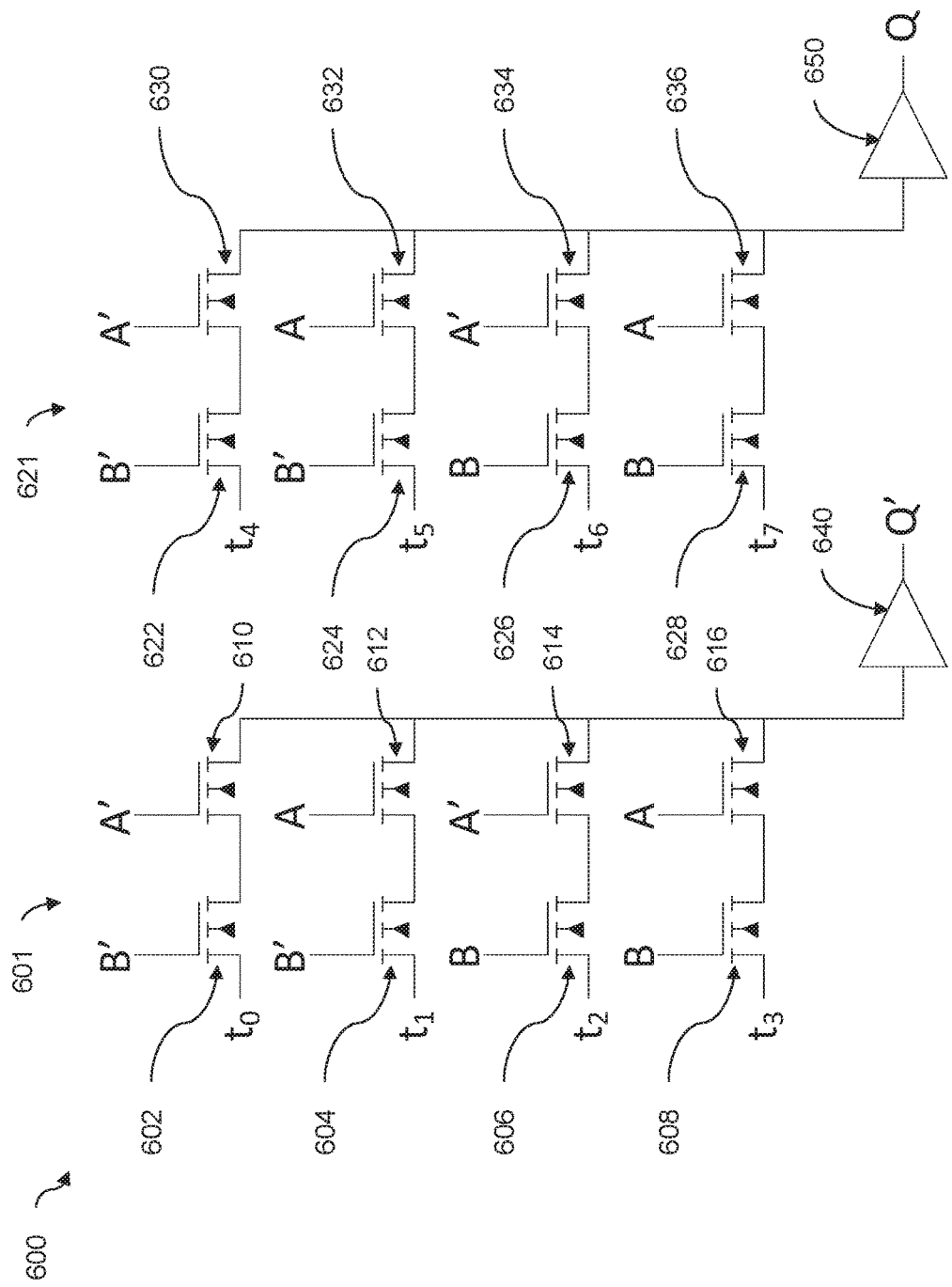
FIG. 6 is circuit diagram illustrating masked gate logic according to one embodiment.

FIG. 6 is circuit diagram illustrating masked gate logic 600 according to one embodiment. For example, masked gate logic 600 can be an implementation of masked gate logic 200 of FIG. 2B. Masked gate logic 600 includes a first portion 601 that includes pass transistors 602, 604, 606, 608, 610, 612, 614, 616, and buffer 640, and a second portion 621 that includes pass transistors 622, 624, 626, 628, 630, 632, 634, 636, and buffer 650.

In first portion 601, mask share value $t_0$ and masked data value B' are input to pass transistor 602, and the output of pass transistor 602 and masked data value A' are input to pass transistor 610. Mask share value $t_1$ and masked data value B' are input to pass transistor 604, and the output of pass transistor 604 and masked data value A are input to pass transistor 612. Mask share value $t_2$ and masked data value B are input to pass transistor 606, and the output of pass transistor 606 and masked data value A' are input to pass transistor 614. Mask share value $t_3$ and masked data value B are input to pass transistor 608, and the output of pass transistor 608 and masked data value A are input to pass transistor 616. The output of pass transistors 610, 612, 614, and 616 are input to buffer 640, which has an output Q'.

In second portion 621, mask share value $t_4$ and masked data value B' are input to pass transistor 622, and the output of pass transistor 622 and masked data value A' are input to pass transistor 630. Mask share value $t_5$ and masked data value B' are input to pass transistor 624, and the output of pass transistor 624 and masked data value A are input to pass transistor 632. Mask share value $t_6$ and masked data value B are input to pass transistor 626, and the output of pass transistor 626 and masked data value A' are input to pass transistor 634. Mask share value $t_7$ and masked data value B are input to pass transistor 628, and the output of pass transistor 628 and masked data value A are input to pass transistor 636. The output of pass transistors 630, 632, 634, and 636 are input to buffer 650, which has an output Q.

Figure 7:
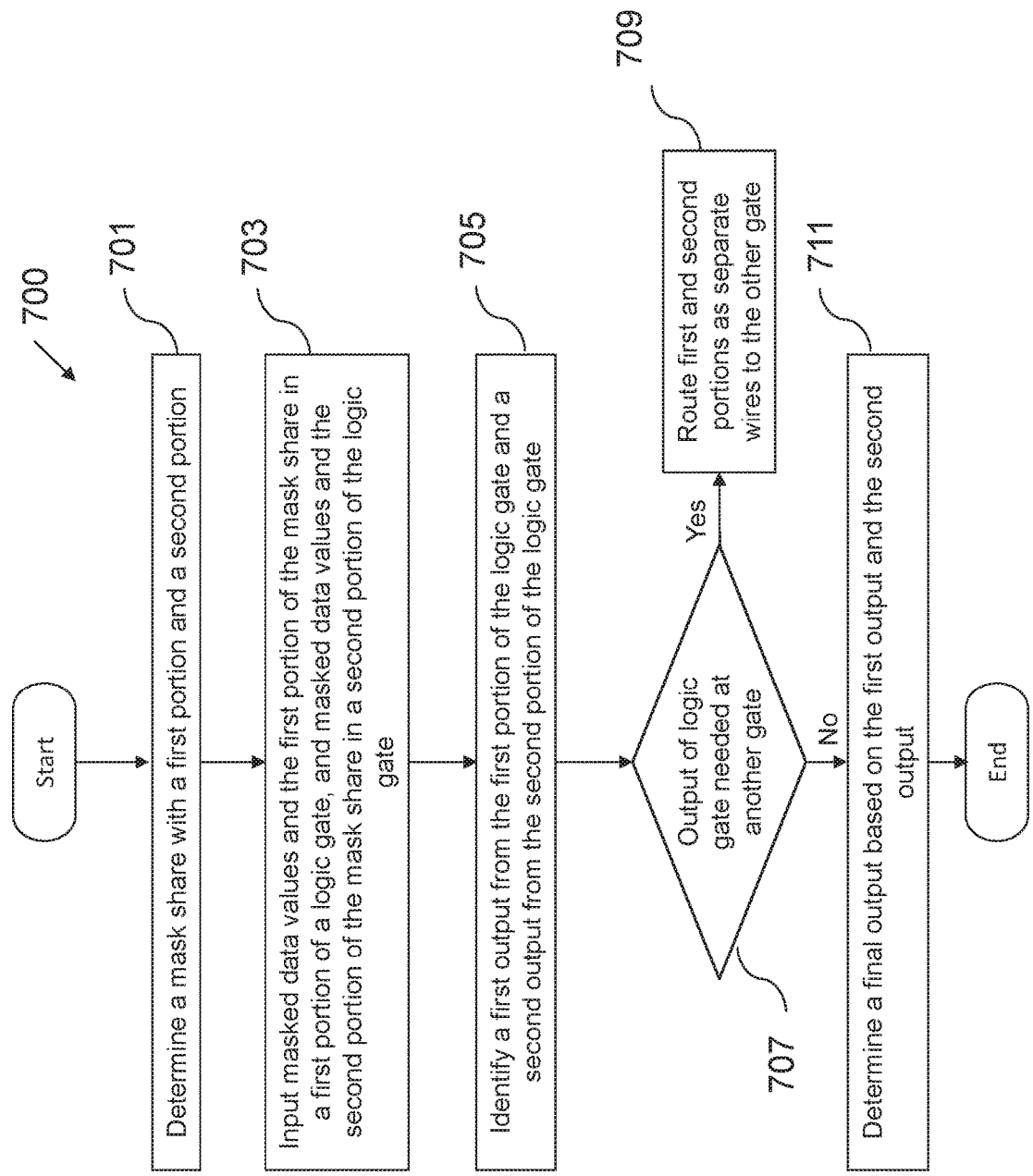
FIG. 7 is a method for a countermeasure to power analysis attacks according to one embodiment.

FIG. 7 illustrates a method 700 for a countermeasure to side channel analysis attacks according to one embodiment. For example, the method 700 can be performed via masked gate logic 200 of FIG. 2B. Though the operations are shown in a particular order, the operations of method 700 can be performed in a different order, more or fewer operations can be performed, and operations can be performed in the same or different clock cycles.

At block 701, a mask share including a first portion and a second portion is determined.

At block 703, masked data values and the first portion of the mask share (e.g., from a FIFO buffer) are input in a first portion of masked gate logic. Also, masked data values and the second portion of the mask share (e.g., from a FIFO buffer) are input in a second portion of the masked gate logic.

At block 705, a first output from the first portion of the masked gate logic is identified, and a second output from the second portion of the masked gate logic is identified.

At block 707, whether the output of the masked gate logic is needed at another gate is determined. At block 709, if the output of the masked gate logic is needed at another gate, then the first and second portions are routed as separate wires to the other gate. At block 711, if the output of the masked gate logic is not needed at another gate, then a final output is determined based on the first output and the second output.

Use of method 700 provides a countermeasure to side channel analysis attacks because an attacker is less likely to be able to successfully use side channel analysis to determine a secret key or other secret information being used by the cryptographic module.

As those of ordinary skill in the art will appreciate, the techniques described above are not limited to particular host environments or form factors. Rather, they can be used in a wide variety of applications, including without limitation: application-specific integrated circuits (ASICs), field programmable gate arrays (FPGAs), systems on chip (SoC), microprocessors, secure processors, secure network devices, cryptographic smartcards of all kinds (including without limitation smartcards substantially compliant with ISO 7816-1, ISO 7816-2, and ISO 7816-3 ("ISO 7816-compliant smartcards")); contactless and proximity-based smartcards and cryptographic tokens (including without limitation smartcards substantially compliant with ISO 14443); stored value cards and systems; cryptographically secured credit and debit cards; customer loyalty cards and systems; cryptographically authenticated credit cards; cryptographic accelerators; gambling and wagering systems; secure cryptographic chips; tamper-resistant microprocessors; software programs (including without limitation to programs for use on personal computers, servers, etc. and programs that can be loaded onto or embedded within cryptographic devices); key management devices; banking key management systems; secure web servers; defense systems; electronic payment systems; micropayment systems and meters; prepaid telephone cards; cryptographic identification cards and other identity verification systems; systems for electronic funds transfer; automatic teller machines; point of sale terminals; certificate issuance systems; electronic badges; door entry systems; physical locks of all kinds using cryptographic keys; systems for decrypting television signals (including without limitation, broadcast television, satellite television, and cable television); systems for decrypting enciphered music and other audio content (including music distributed over computer networks); systems for protecting video signals of all kinds; content protection and copy protection systems (such as those used to prevent unauthorized copying or use of movies, audio content, computer programs, video games, images, text, databases, etc.); cellular telephone scrambling and authentication systems (including telephone authentication smartcards); secure telephones (including key storage devices for such telephones); cryptographic PCMCIA cards; portable cryptographic tokens; and cryptographic data auditing systems.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "providing," "receiving," "generating," or the like, refer to the actions and processes of a computing device that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" throughout is not intended to mean the same embodiment unless described as such.

The above description sets forth numerous specific details such as examples of specific systems, components, methods and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the present invention.

It is to be understood that the above description is intended to be illustrative and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A system comprising:
    a device comprising a cryptographic circuit to perform a cryptographic operation; and
    a power delivery network coupled to the device, wherein the cryptographic circuit comprises:
        a mask generator circuit that determines a mask share, wherein a first portion of the mask share comprises a first number of zero-values and a second number of one-values, and a second portion of the mask share comprises the first number of one-values and the second number of zero-values; and
        masked gate logic circuitry coupled to the mask generator circuit, the masked gate logic circuitry comprising a first portion and a second portion, wherein the first portion of the masked gate logic circuitry receives masked data values and the first portion of the mask share, and provides a first output, and wherein the second portion of the masked gate logic circuitry receives the masked data values and the second portion of the mask share, and provides a second output.

2. The system of claim 1, wherein the first portion of the masked gate logic circuitry comprises a first four AND gates and a first OR gate, the first OR gate receiving outputs of the first four AND gates, and wherein the second portion of the masked gate logic circuitry comprises a second four AND gates and a second OR gate, the second OR gate receiving outputs of the second four AND gates.

3. The system of claim 1, wherein the cryptographic circuit further comprises additional logic circuitry coupled to the masked gate logic circuitry, wherein the additional logic circuitry is to determine a final output based on the first output and the second output, wherein the final output is independent of secret data that is masked in the masked data values.

4. The system of claim 1, wherein the cryptographic circuit further comprises additional logic circuitry coupled to the masked gate logic circuitry, wherein the additional logic circuitry is to perform an additional function on the first output and the second output before outputting a final output, wherein the final output is independent of secret data that is masked in the masked data values.

5. The system of claim 2, wherein the output of exactly one of the first four AND gates and the second four AND gates rises, and wherein the output of the OR gate receiving the output of the AND gate that rises also rises.

6. A circuit comprising:
    Boolean logic circuitry to receive cipher input values and masking values, wherein the Boolean logic circuitry outputs masked data values;
    a mask generator circuit that determines a mask share, wherein a first portion of the mask share comprises a first number of zero-values and a second number of one-values, and a second portion of the mask share comprises the first number of one-values and the second number of zero-values; and
    masked gate logic circuitry coupled to the mask generator circuit and the Boolean logic circuitry, the masked gate logic circuitry comprising a first portion and a second portion,
    wherein the first portion of the masked gate logic circuitry:
        receives the masked data values from the Boolean logic circuitry;
        receives the first portion of the mask share from the mask generator circuit; and provides a first output; and
    wherein the second portion of the masked gate logic circuitry:
        receives the masked data values from the Boolean logic circuitry;
        receives the second portion of the mask share from the mask generator circuit; and
        provides a second output.

7. The circuit of claim 6, further comprising additional Boolean logic circuitry coupled to the masked gate logic circuitry, the additional Boolean logic circuitry to:
    receive the first output from the first portion of the masked gate logic circuitry;
    receive the second output from the second portion of the masked gate logic circuitry; and
    provide cipher output values.

8. The circuit of claim 6, wherein the mask generator circuit comprises:
    a random number generator coupled to the Boolean logic circuitry, the random number generator to generate the masking values;
    a table generator coupled to the random number generator, the table generator to generate the mask share; and
    a storage element coupled to the table generator and the masked gate logic circuitry, the storage element to store the mask share.

9. The circuit of claim 6, wherein the first portion of the masked gate logic circuitry comprises a first four AND gates and a first OR gate, the first OR gate receiving outputs of the first four AND gates, and wherein the second portion of the masked gate logic circuitry comprises a second four AND gates and a second OR gate, the second OR gate receiving outputs of the second four AND gates.

10. The circuit of claim 6, further comprising additional logic circuitry coupled to the masked gate logic circuitry, wherein the additional logic circuitry is to determine a final output based on the first output and the second output, wherein the final output is independent of the cipher input values.

11. The circuit of claim 6, further comprising additional logic circuitry coupled to the masked gate logic circuitry, wherein the additional logic circuitry is to perform an additional function on the first output and the second output before outputting a final output, wherein the final output is independent of the cipher input values.

12. The circuit of claim 6, further comprising a storage element coupled to the masked gate logic circuitry, the storage element to store the mask share for one or more clock cycles prior to the first portion of the masked gate logic circuitry receiving the masked data values and the first portion of the mask share.

13. The circuit of claim 6, wherein the masked gate logic circuitry is to receive precharge signals during a first stage of a cryptographic operation, wherein the masked generator circuit is to determine the mask share during a second stage of the cryptographic operation, wherein the masked gate logic circuitry is to receive the masked data values and the mask share during a third stage of the cryptographic operation, and wherein the masked gate logic circuitry is to output the first portion and the second portion during a fourth stage of the cryptographic operation.

14. The circuit of claim 8, wherein the storage element is a first-in-first-out (FIFO) buffer.

15. The circuit of claim 9, wherein the output of exactly one of the first four AND gates and the second four AND gates rises, and wherein the output of the OR gate receiving the output of the AND gate that rises also rises.

16. A system comprising:
an integrated circuit comprising a set of propagation paths and a cryptographic circuit to perform a cryptographic operation; and
a power delivery network coupled to the integrated circuit, the power delivery network to delivery power to the integrated circuit, wherein the cryptographic circuit comprises:
  masked gate logic circuitry that outputs output signals on each of the set of propagation paths with equal probability during the cryptographic operation to mask secret data from being detected via power analysis of the power delivery network; and
  additional logic circuitry coupled to the masked gate logic circuitry, wherein the additional logic circuitry is to determine a final output based on a first output and a second output of the output signals, wherein the final output is independent of secret data that is masked in the masked data values.

17. The system of claim 16, wherein the masked gate logic circuitry comprises:
a first portion to receive masked data values and a first portion of a mask share, the first portion to provide the first output, wherein the masked data values correspond to the secret data being masked by masking values; and
a second portion to receive the masked data values and a second portion of the mask share, the second portion to provide the second output.

18. The system of claim 17, wherein the first portion of the masked gate logic circuitry comprises a first four AND gates and a first OR gate, the first OR gate receiving outputs of the first four AND gates, and wherein the second portion of the masked gate logic circuitry comprises a second four AND gates and a second OR gate, the second OR gate receiving outputs of the second four AND gates.

19. The system of claim 18, wherein the output of exactly one of the first four AND gates and the second four AND gates rises, and wherein the output of the OR gate receiving the output of the AND gate that rises also rises.

* * * * *